United States Patent
Glerum et al.

(10) Patent No.: US 6,629,267 B1
(45) Date of Patent: Sep. 30, 2003

(54) METHOD AND SYSTEM FOR REPORTING A PROGRAM FAILURE

(75) Inventors: Kirk A. Glerum, Redmond, WA (US); Matthew J. Ruhlen, Redmond, WA (US); Eric A. LeVine, Seattle, WA (US); E. Peter Oosterhof, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/571,629

(22) Filed: May 15, 2000

(51) Int. Cl.$^7$ ................................................. G06F 11/00
(52) U.S. Cl. .............................. 714/38; 714/26; 714/46; 714/57
(58) Field of Search ............................. 714/38, 57, 48, 714/25, 26, 46, 47

(56) References Cited

U.S. PATENT DOCUMENTS

| | | | | |
|---|---|---|---|---|
| 5,193,178 A | * | 3/1993 | Chillarege et al. ............. | 714/25 |
| 5,790,780 A | * | 8/1998 | Brichta et al. ................. | 714/46 |
| 5,928,369 A | * | 7/1999 | Keyser et al. ................. | 714/47 |
| 5,944,839 A | * | 8/1999 | Isenberg ....................... | 714/26 |
| 5,948,112 A | * | 9/1999 | Shimada et al. ............... | 714/16 |
| 5,974,568 A | * | 10/1999 | McQueen ...................... | 714/38 |
| 6,029,258 A | * | 2/2000 | Ahmad ......................... | 714/46 |
| 6,357,019 B1 | * | 3/2002 | Blaisdell et al. ............... | 714/38 |
| 6,381,711 B1 | * | 4/2002 | Chiang et al. ................. | 714/48 |
| 6,412,082 B1 | * | 6/2002 | Matsuura ...................... | 714/38 |

* cited by examiner

*Primary Examiner*—Robert Beausoliel
*Assistant Examiner*—Yolanda L. Wilson
(74) *Attorney, Agent, or Firm*—Merchant & Gould

(57) ABSTRACT

Method and system for reporting program failures. The system extracts information about a failure in a program module, such as the location of the failure, and establishes communication with a repository, such as a server. The information about the failure may be used to search the repository to determine whether the particular bug that caused the failure has already been fixed. If so, then the system assists the user in downloading the fix (such as by pointing the user to a particular website for downloading a service release). If a particular failure has not been diagnosed and corrected, then additional relevant information from the user's computer may be uploaded to the repository to provide the developers of the program module enough information about the failure to diagnose the bug and fix it (in a service release or in a later version of the program module).

17 Claims, 3 Drawing Sheets

METHOD AND SYSTEM FOR REPORTING A PROGRAM FAILURE

TECHNICAL FIELD

This invention relates to software program modules. More particularly, this invention relates to a method and system for detecting a failure in a program module and reporting the failure to a central repository for storage and analysis.

BACKGROUND OF THE INVENTION

Despite the best efforts of software developers, software programs inevitably fail at one time or another. One type of failure is a crash. A crash occurs while a program module is running and results in the suspension of operation of the program module. Crashes are frustrating to users and, in some cases, may cause the user to lose work. Another type of software program failure is a set-up failure. Set-up failures occur during installation of a program module onto a user's computer. Set-up failures may prevent certain aspects of the program module, or even the entire program module, from being installed on a user's computer.

Crashes and set-up failures create a significant amount of work for product support personnel. Product support personnel, typically contacted via telephone, are often limited in their ability to diagnose problems due to the limited amount of information they can receive from the user. For example, the product support personnel may only know what the user was doing when the crash occurred or at what point of the installation the set-up failure occurred. There may be a significant amount of information on the user's computer that may be useful to the product support personnel or to the software developers to diagnose the failures. However, because product support personnel and the software developers are not physically present at the user's computer, this information can not be extracted and analyzed.

To gather more information about a crash, different approaches have been taken. For example, America Online has the ability to determine the location of a crash of Microsoft's "INTERNET EXPLORER" web browser and report this information to Microsoft. However, other information regarding the state of a user's machine at the time of the crash is not known and it is difficult to distinguish between different crashes. Without this valuable information, not much can be done to determine whether there is a bug and, if so, correct the bug. Other approaches have been taken to tackle the problems of failures. For example, Netscape's "COMMUNICATOR" web browser includes a quality feedback agent to report a crash to Netscape, although it is not known what information is reported to Netscape. Moreover, both of these approaches apply to fatal crashes, i.e., when the operating system has decided to kill the application. Thus, there is a need for a method and system for reporting non-fatal crashes, such as when the operating system continues executing the application's code.

Thus, there is a need for a method and system for extracting from a computer relevant information regarding a failure of a program module, including the location of the failure, and transmitting this information to a software manufacturer so that the failure may be diagnosed and corrected. There is also a need for a method and system for requesting information from a failed program module, in addition to the location of the failure, and transmitting this additional information to a central repository for storage and analysis.

SUMMARY OF THE INVENTION

The present invention satisfies the above described needs by providing a method and system for reporting program failures. A failure may be a crash of the program module or a set-up failure during installation of the program module. Additionally, the failure may be a problem encountered during in-house testing of the program module. Once detected, the program failures may be reported directly to a repository, such as a server operated by the manufacturer of the program that failed. The repository may also be a local file server operated by a corporation. For example, the corporate file server repository may be used to store the failures encountered by users in a corporate environment until these failures may be reported to the software manufacturer's server.

After a failure is reported to the repository, such as a manufacturer's server or a local corporate file server, additional data may be requested regarding the state of the user's computer and the program module that failed. This additional data may be used to develop a fix to the failure to improve the performance of the program module.

In one aspect, the invention comprises a computer-implemented method and system for dealing with a failure of a program module. After the failure is detected, the user is presented with a dialog box asking whether the user wants to report the problem to the manufacturer of the program module. If the user chooses to report the problem, then a failure reporting executable sends the location, or other identifying information, of the failure to a repository. If necessary, the failure reporting executable may also report additional information about the failed application program module to the repository. The repository may then provide a fix to the failure if one is available.

In another aspect, the invention determines there is a failure in an application program module. In response to a determination that there is a failure in the application program module, a location of the failure is determined. The location of the failure is sent to a repository. The location of the failure is compared to a number of prior reported failures stored in the repository. If the location of the failure matches at least one of prior reported failures, then it is determined whether there is a request for additional data stored in association with the matching prior reported failure. If so, then the requested additional data is located in the application program module and transmitted to the repository for storage. This additional data may then be used by developers to diagnose the failure and provide a fix to the failure in the future. If the location of the failure does not match any prior reported failures, then the failure has been unreported and a new entry is created in the repository for the failure.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
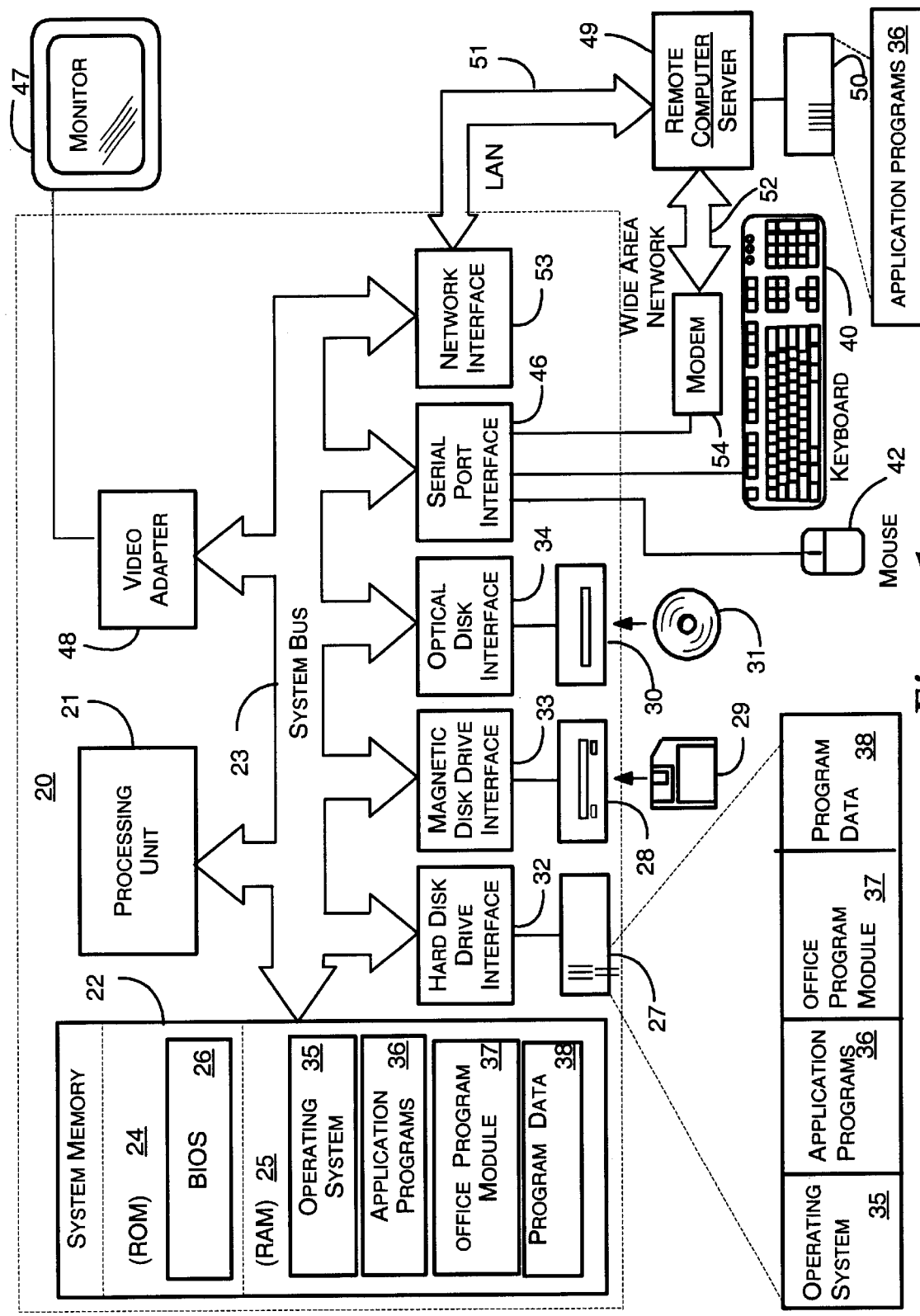
FIG. 1 is a block diagram of a computer that provides the exemplary operating environment for the present invention.

The present invention is directed to a method and system for reporting software program module failures. A failure may be a crash of the program module or a set-up failure during installation of the program module. Additionally, the failure may be a problem encountered during in-house testing of the program module by the program module's manufacturer. Once detected, the program failures may be reported directly to a repository, such as a server operated by the manufacturer of the program that failed. The repository may also be a local file server operated by a corporation. For example, the corporate file server repository may be used to store the failures encountered by users in a corporate environment until these failures are reported to the manufacturer's server.

In one embodiment, the invention is incorporated into the "OFFICE" program module, marketed by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

System for Reporting Failures

In one embodiment, the present invention is a system for reporting to a software manufacturer relevant information regarding a failure of one of its program modules. The relevant failure information is stored in a repository such as a remote server or a local corporate file server. The relevant failure information may then be analyzed by the software manufacturer's developers so that solutions and fixes to the failures may be developed.

Figure 2:
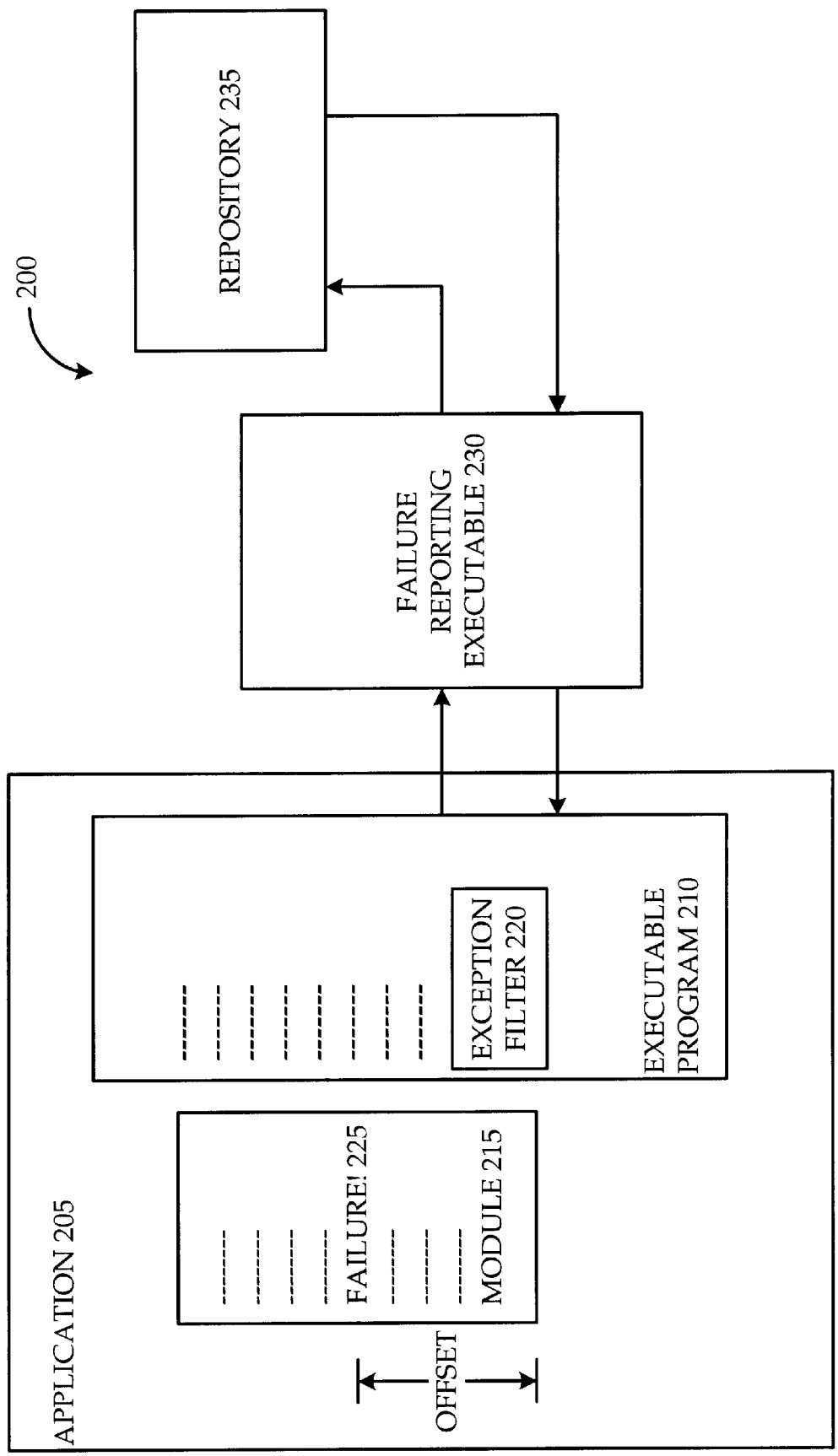
FIG. 2 is a component block diagram of an exemplary system for reporting a program failure in accordance with an embodiment of the present invention.

Referring now to FIG. 2, a component block diagram of an exemplary system 200 for reporting a program failure in accordance with an embodiment of the present invention will be described. The system 200 comprises an application program module 205. For example, application program module 205 may be the "WORD" word processor program module, marketed by Microsoft Corporation of Redmond, Wash. and included in the "OFFICE" 37 (FIG. 1) suite of program modules.

The system 200 further comprises an executable program 210 running inside of application program module 205. For example, in the "WORD" word processor program module, the executable program may be "WinWord.exe". An executable program is a program that can be run and typically means a compiled program translated into machine code in a format that can be loaded into memory and run by a computer's processor. The lines of code in executable program 210 are illustrated as dashed lines in FIG. 2.

The system 200 further comprises a module 215 being executed by the executable program 210 inside the application program module 205 at the time of the failure. For example, the module 215 may be a dynamic-link library such as "mso.dll". The lines of code in module 215 are illustrated as dashed lines in FIG. 2.

The system 200 also comprises an exception filter 220. Exception filters are well-known in the art and may be registered by program modules when the operating system 35 is started. When a failure (an exception) occurs, the exception filter 220 code is executed. For example, suppose a failure occurs while executable program 210 is executing instructions running module 215 at location 225. If executable program 210 has registered exception filter 220 with the operating system, then the exception filter 220 is executed when executable program 210 encounters an exception.

In the system 200, exception filter 220 executes a failure reporting executable 230. The failure reporting executable 230 is an executable program comprising all of the instructions needed to communicate between the application program module 205 and a repository 235. The communications between the failure reporting executable 230, the application program module 205 and the repository 235 are illustrated as arrows in FIG. 2. The failure reporting executable 230 is preferably separate from the application program module 205 because of the possible instability of the application program module (having experienced a failure).

The repository 235 is typically a remote server operated by the manufacturer or marketer of the application program module 205. For example, if the application program module is the "WORD" word processor program module, then the server may be operated by Microsoft Corporation of Redmond, Wash. If the repository 235 is a remote server, then the failure reporting executable 230 may communicate with it via conventional means, such as by using a web browser to connect to the server via the Internet.

In some environments, such as the corporate environment, the repository 235 may be operated locally at the corporation. For example, a corporation may not allow their employees to have Internet access or a corporation may not want their employees reporting failures directly to an outside software manufacturer (potentially divulging sensitive corporate information). In those instances, the repository 235 may be a local server. If the repository is a local corporate repository, a system administrator at the corporation will typically be tasked with periodically uploading relevant information to the software manufacturer so that the software manufacturer may correct the failures being experienced by the corporation.

Having described the system 200 for reporting a program failure in accordance with an embodiment of the present invention, an exemplary method 300 will be described in reference to FIG. 3.

Figure 3:
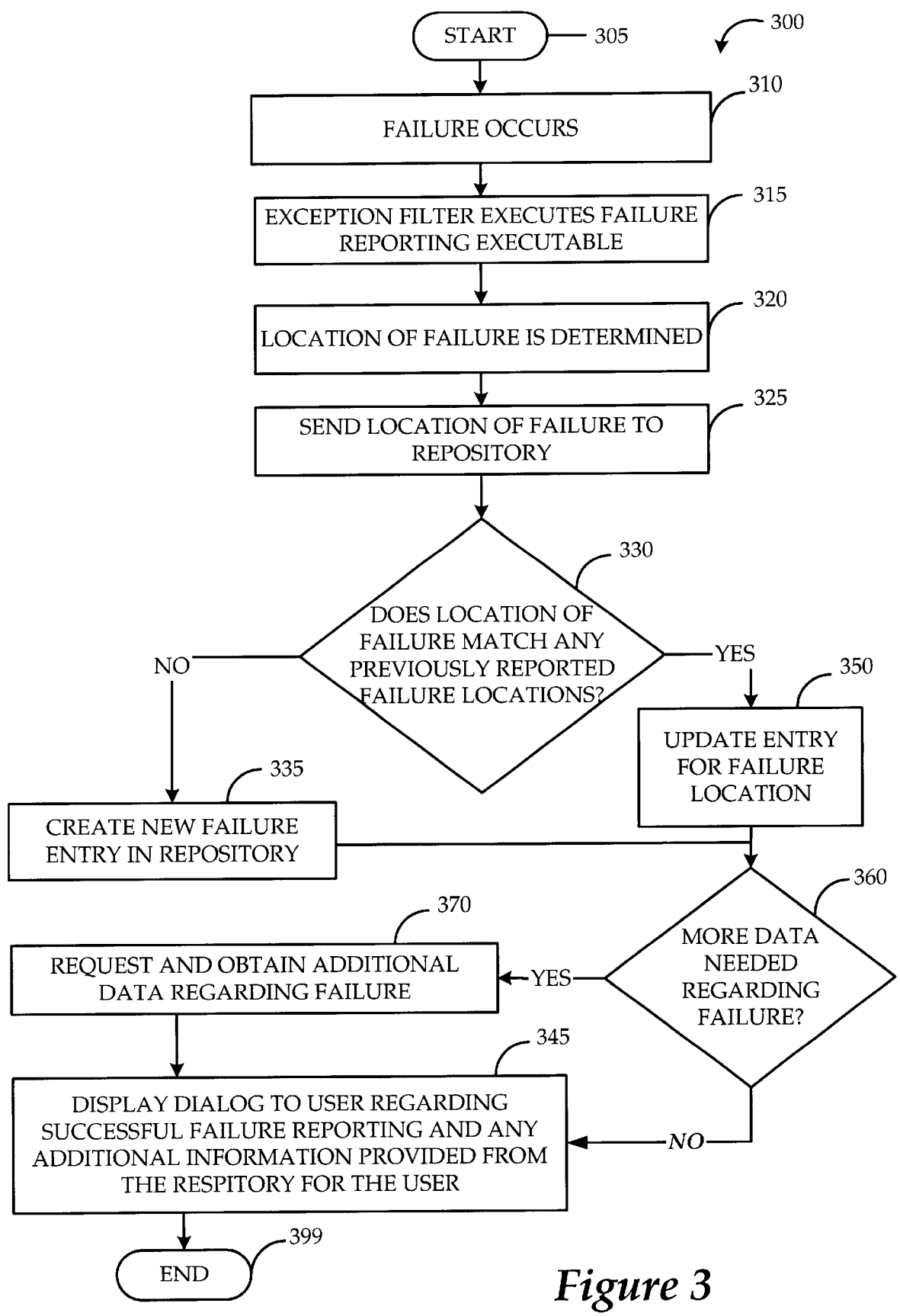
FIG. 3 is a flowchart illustrating an exemplary method for reporting a program failure in accordance with an embodiment of the present invention.

FIG. 3 is a flowchart illustrating an exemplary method 300 for reporting a program failure in accordance with an embodiment of the present invention. The method 300 will be described with reference to the elements of system 200 (FIG. 2).

The method 300 begins at start step 305 and proceeds to step 310 where a failure in the application program module 205 occurs at location 225. The operating system 35 (FIG. 1) throws the application program module 205 out of memory and the method 300 proceeds to step 315.

At step 315, the exception filter 220 executes the failure reporting executable 230. The method then proceeds to step 320.

At step 320, the failure reporting executable 230 determines the location 225 of the failure in the application program module 205. It should be understood that the operating system 35 may be used to determine the location 225 of the failure. After the location of the failure is determined at step 320, the method proceeds to step 325.

At step 325, the failure reporting executable sends the location of the failure to the repository 235. Typically, the location of the failure is sent as a bucket. A bucket is a set of information defining the location of the failure. If a bucket from one failure matches a bucket from another failure, then it is assumed that both failures are caused by the same bug. Although not always accurate (because more than one bug may be at the same location), this assumption that failures with the same bucket are caused by the same bug allows for effective organization in the repository.

Typically, the information in a bucket comprises an AppName, an AppVer, a ModuleName, a ModuleVer, and an offset into that module. The AppName is the name of the executable program 210 that was executing at the time of the failure, such as "WinWord". The AppVer is the version number of the executable program 210 that was executing at the time of the failure, such as "10.1204.1.0". The ModuleName is the name of the module 215 that was executing at the time of the failure, such as "mso.dll". The ModuleVer is the version number of the module 215 that was executing at the time of the failure, such as "10.124.1.0". The offset is the line number, or vertical offset, into the module where the failure occurred, such as "1234". The offset is illustrated in FIG. 2. In certain circumstances, it may be impossible to determine the module (such as when the application program jumps to an area of its address space that is not part of any module. In these instances, the ModuleName is "unknown" and the ModuleVer is "0.0.0.0".

It should be understood that the location of the failure is simply identifying information about the failure so that one failure may be distinguished from another failure. In alternative embodiments of the present invention, the location, i.e., identifying information, of the failure may comprise only a single piece of information rather than AppName, an AppVer, a ModuleName, a ModuleVer, and an offset. Conversely, in alternative embodiments, the location of the failure may comprise a plurality of data.

After the location of the failure is sent to the repository at step 325, the method proceeds to decision step 330. It is determined whether the location 225 of the failure matches the location of any previously reported failures at decision step 330. Typically, the bucket of the failure is compared with the previously reported buckets to see whether the bucket of the failure matches one of the previously reported buckets. This determination is helpful to determine whether the failure is a new failure (i.e., one that has not been reported before), to determine whether there is a fix for the failure, to determine whether the software developers have requested that more information be collected regarding this type of failure, etc.

If, at decision step 330, it is determined that the location of the failure does not match the location of any previously reported failures, then the method proceeds to step 335. At step 335, a new entry is created in the repository corresponding to the location of the failure. The entry may comprise the location information, such as the location information in the bucket, and a counter to track the number of times that this failure location is encountered by users. For new entries, default information may be stored for convenience, such as a default response to provide the user. However, it is just as simple to not store any default information and take the lack of information to indicate default values The method then proceeds to decision step 360.

Referring back to decision step 330, if it is determined that the location of the failure does match the location of a previously reported failure, then the method proceeds to step 350.

At step 350, the repository updates the entry of the particular failure location. It should be understood that typically the repository stores a counter for each failure location entry to determine which failure locations are causing the most problems with users. The repository increases the counter by one at step 350. Other updates to the failure location entry in the repository may also be made at step 350, such as the location of the uploaded cab file (see step 370 below). The method 300 then proceeds to decision step 360.

At decision step 360, it is determined whether any more data is required by the repository for the failure location. It should be understood that, in a preferred embodiment, the failure location entry includes information about what data to collect from the failed application program module and a number reflecting how many more times this information needs to be collected. This information about what data to collect and how much to collect is typically decided by the software developers of the application program module 205. For example, suppose a particular location 225 is experiencing numerous failures. In order to diagnose and correct the failure, a software developer may determine that it is important to collect certain information. However, because the particular location is experiencing numerous failures it may be inefficient to collect information from every user who experiences the same failure. The repository is programmed to know what information to collect from users who experience a particular failure and also how many times to collect this information.

If, at decision step 360, it is determined that no more data is required for the failure location, then the method proceeds to step 345. However, if it is determined that additional data is required for the failure location, then the method proceeds to step 370.

At step 370, the additional data is gathered from the application program module 205 and sent to the repository for storage. In one embodiment, the failure reporting executable 230 requests and receives the data from the application program module 205. The failure reporting executable 230 then sends the data to the repository for storage. As part of requesting and receiving the data, the failure reporting executable may generate a minidump. The minidump is essentially a collection of relevant information that provides an autopsy of the crashed application program module. The minidump may comprise information about the state of the process at the time the dump was collected that is helpful in understanding what caused the failure. Typically, the minidump comprises brief infomation about the computer (such as operating system and CPU); a list of all the threads in the process with their CONTEXTS (an operating system term describing the current state of the thread's execution on the CPU) and memory stack; a list of all modules loaded in the process and their relevant information (name, version number, where they are loaded into the process space, etc.); and the global data associated with specific modules (such as mso.dll, outllib.dll and the module containing the failure).

In addition to the minidump, the data may comprise registry keys, files, file versions, documents, and WQL queries (WMI (Windows Management Interface) Query Language). Essentially, the data may comprise any information needed from the failed application program module 205 to diagnose the failure.

In a preferred embodiment, the data is sent to the repository as .cab files or in another compressed format. .cab is used as a file extension for cabinet files which are well-known. Cabinet files are multiple files compressed into one and extractable with the extract.exe utility.

After the data is requested and obtained at step 370, the method 300 proceeds to step 345 where a dialog box is displayed to the user regarding a successful failure reporting and thanking the user for reporting the failure to the software manufacturer. The dialog box may also comprise any additional information provided from the repository for the user. The method then ends at step 399.

It should be understood that the data sent to the repository at step 370 may be used by developers to diagnose the failure and, if possible, develop a fix for the failure.

It should be understood that, in an alternative embodiment, the failure reporting executable 230 displays a user interface informing the user of the problem and with options specific to the application program module 205. The user interface also includes an option asking whether the user wishes to report the failure before step 325. If the user does not want to report the failure, then the method 300 ends at step 399.

In alternative embodiments, the failure reporting executable could be in the failed application program module in an alternative embodiment. However, it is preferable to have the failure reporting executable outside the failed application program module because of the volatile state of the failed application program module.

It should be understood that the failure reporting executable 230 comprises instructions to generate bucket information for different types of failures and comprises instructions to gather primary data about these different types of failures. The data needed to diagnose a set-up failure may be entirely different than the data needed to diagnose a crash. For example, for a set-up failure, the failure reporting executable 230 comprises instructions to gather the set-up logs to send to the repository.

In alternative embodiments, the present invention handles all sorts of different types of failures. These failures may comprise crashes, set-up failures and asserts. Asserts are well-known in the art as internal development and consistency tools used in the testing of application program modules. Thus, applying the present invention to the software development process, asserts can be tracked so that developers know what locations are experiencing the most failures during testing and development of a program module.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for reporting a failure in an application program module, the method comprising the steps of:
   determining there is a failure in the application program module;
   in response to a determination that there is a failure in the application program module, determining a location of the failure;
   transmitting the location of the failure to a repository;
   comparing the location of the failure to a plurality of prior reported failures stored in the repository;
   if the location of the failure matches at least one of prior reported failures, then determining whether there is a request for additional data stored in association with the at least one of the prior reported failures; and
   if so, then locating the requested additional data in the application program module and transmitting the requested additional data to the repository.

2. The method of claim 1, wherein the failure is a crash of the application program module.

3. The method of claim 1, wherein the failure is a failure during set-up of the application program module.

4. The method of claim 1, further comprising the steps of:
   prior to determining a location of the failure, displaying a dialog box requesting instructions from a user regarding whether to report the failure to the repository; and
   receiving instructions from the user to report the failure to the repository.

5. The method of claim 1 wherein the repository is a remote server.

6. The method of claim 1 further comprising the steps of:
   storing the additional data in association with the at least one of the prior reported failures.

7. A computer-readable medium having computer-executable instructions for performing the steps recited in claim 1.

8. The method of claim 1, wherein the additional data comprises a minidump.

9. The method of claim 1, wherein the additional data comprises a minidump and a log file of prior activity of the application program.

10. The method of claim 1 further comprising the steps of:
    determining whether there is a fix to the failure stored in association with the at least one of the prior reported failures; and
    if so, then transmitting the fix to the application program module.

11. The method of claim 1, further comprising the steps of:
    determining whether there is a fix to the failure stored in association with the at least one of the prior reported failures; and
    if so, then transmitting a location of the fix to the application program module.

12. The method of claim 1, further comprising the steps of:
    if the location of the failure does not match at least one of prior reported failures, then storing a new entry in the prior reported failures.

13. The method of claim 12, wherein the new entry comprises the location of the location of the failure.

14. The method of claim 1 wherein the location comprises an instruction in a setup routine that leads to a setup failure.

15. A system for reporting a failure in an application program module on a user's computer comprising:
    a repository for storing information for a plurality of prior reported failures;
    a failure reporting executable residing on the user's computer for communicating a failure detected in the application program module to the repository and for determining, based on the detected failure and the information stored in the repository, whether to request additional information associated with at least one of the plurality of prior reported failures from the application program module; and
    an exception filter residing on the user's computer for executing the failure reporting executable upon detection of the failure in the application program module.

16. The system of claim 15, wherein the repository is a remote server and wherein the failure reporting executable communicates with the remote server using a web browser program module residing on the user's computer.

17. The system of claim 15, wherein the repository is a local server and wherein the failure reporting executable communicates with the local server via an Intranet connection.

* * * * *

UNITED STATES PATENT AND TRADEMARK OFFICE
CERTIFICATE OF CORRECTION

PATENT NO.    : 6,629,267 B1
DATED         : September 30, 2003
INVENTOR(S)   : Glerum et al.

It is certified that error appears in the above-identified patent and that said Letters Patent is hereby corrected as shown below:

<u>Column 10,</u>
Line 23, "the location of the location" should read -- the location --

Signed and Sealed this

Thirteenth Day of January, 2004

JON W. DUDAS
*Acting Director of the United States Patent and Trademark Office*